(12) United States Patent
Liu et al.

(10) Patent No.: US 11,500,271 B2
(45) Date of Patent: *Nov. 15, 2022

(54) GIMBAL PHOTOGRAPHING DEVICE

(71) Applicant: SZ DJI OSMO TECHNOLOGY CO., LTD., Shenzhen (CN)

(72) Inventors: Yifen Liu, Shenzhen (CN); Dengfeng Hu, Shenzhen (CN); Tianfei Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,074

(22) Filed: Nov. 6, 2020

(65) Prior Publication Data
US 2021/0055636 A1    Feb. 25, 2021

Related U.S. Application Data

(63) Continuation of application No. 16/723,585, filed on Dec. 20, 2019, now Pat. No. 10,845,680, which is a
(Continued)

(51) Int. Cl.
*G03B 17/56* (2021.01)
*F16M 11/08* (2006.01)
(Continued)

(52) U.S. Cl.
CPC ........... *G03B 17/561* (2013.01); *F16M 11/08* (2013.01); *F16M 11/18* (2013.01); *F16M 11/2042* (2013.01)

(58) Field of Classification Search
USPC .......................................... 396/428
See application file for complete search history.

(56) References Cited

U.S. PATENT DOCUMENTS 6,411,332 B1    6/2002  Whitby et al.
D813,924 S  *  3/2018  Zheng .......................... D16/203
(Continued)

FOREIGN PATENT DOCUMENTS

CN    1387079 A    12/2002
CN    1649390 A    8/2005
(Continued)

OTHER PUBLICATIONS

The World Intellectual Property Organization (WIPO) International Search Report for PCT/CN2017/095193 dated Feb. 24, 2018 5 pages.

*Primary Examiner* — Rodneye Fuller
(74) *Attorney, Agent, or Firm* — Anova Law Group, PLLC

(57) ABSTRACT

A gimbal photographing device includes a body including a supporting wall and a side wall adjacent to the supporting wall, a folding mechanism connected to the body and configured to rotate around a rotation axis, and a gimbal camera connected to the folding mechanism and having an expanded state and a folded state. In response to the folding mechanism driving the gimbal camera to rotate to the expanded state, at least a portion of the folding mechanism abuts against the supporting wall. In response to the folding mechanism driving the gimbal camera to rotate to the folded state, the gimbal camera fits to the side wall of the body.

20 Claims, 9 Drawing Sheets

Related U.S. Application Data continuation of application No. PCT/CN2017/095193, filed on Jul. 31, 2017.

(51) Int. Cl.
    *F16M 11/18*     (2006.01)
    *F16M 11/20*     (2006.01)

(56) References Cited

U.S. PATENT DOCUMENTS

| | | |
|---|---|---|
| D852,865 S | 7/2019 | Hu et al. |
| D868,138 S | 11/2019 | Hu et al. |
| 10,845,680 B2 * | 11/2020 | Liu ........................ F16M 13/00 |
| 2011/0267432 A1 | 11/2011 | Kumakura |
| 2014/0009566 A1 | 1/2014 | Odanaka et al. |
| 2015/0362122 A1 | 12/2015 | Brown |
| 2017/0176843 A1 | 6/2017 | Yamakose et al. |
| 2017/0302852 A1 * | 10/2017 | Lam ...................... H04N 5/2252 |
| 2019/0154191 A1 | 5/2019 | Ma et al. |
| 2019/0339595 A1 | 11/2019 | Liu et al. |
| 2020/0124228 A1 | 4/2020 | Guo et al. |
| 2020/0142284 A1 | 5/2020 | Liu et al. |
| 2020/0149678 A1 | 5/2020 | Liu et al. |

FOREIGN PATENT DOCUMENTS

| | | |
|---|---|---|
| CN | 205606108 U | 9/2016 |
| CN | 106464079 A | 2/2017 |
| CN | 205919075 U | 2/2017 |
| CN | 205938366 U | 2/2017 |
| CN | 206018229 U | 3/2017 |
| EP | 0581286 A1 | 2/1994 |
| EP | 0862079 B1 | 9/1998 |
| JP | 2807616 B2 | 10/1998 |
| WO | 2016168838 A2 | 10/2016 |

\* cited by examiner

GIMBAL PHOTOGRAPHING DEVICE

CROSS-REFERENCE TO RELATED APPLICATIONS

This application is a continuation of U.S. application Ser. No. 16/723,585, filed Dec. 20, 2019, which is a continuation of International Application No. PCT/CN2017/095193, filed Jul. 31, 2017, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

TECHNICAL FIELD

The present disclosure relates to the field of gimbal technology, and in particular relates to a gimbal photographing device.

BACKGROUND

In the existing technology, a gimbal photographing device or a handheld gimbal photographing device can capture a stable image in a moving state and thus, it is favored by a large number of users. The gimbal photographing device uses a gyroscope and a motor to stabilize the camera of the gimbal photographing device, to make the image capture process stable and anti-shaking.

The gimbal photographing device usually includes a body and a gimbal camera mounted on the body. When the gimbal photographing device is in operation, the position of the gimbal camera can be adjusted according to the user's motion, so that the camera of the gimbal camera can remain at a certain level, to get a stable image capture. However, when the gimbal camera is not in operation, the gimbal camera randomly sways and occupies a relatively large space, causing an unstable structure of the gimbal photographing device which is unfavorable for carrying and storage.

SUMMARY

In accordance with the disclosure, there is provided a gimbal photographing device, including: a body having a supporting wall; a folding mechanism connected to the body; and a gimbal camera connected to the folding mechanism. The gimbal camera fits to the body through the folding mechanism and has an expanded state and a folded state. The supporting wall is configured to support the folding mechanism and the gimbal camera. The folding mechanism includes a supporting base having a rotating portion and a bent portion. A first end of the bent portion is connected to the rotating portion, and a second end of the bent portion is connected to the gimbal camera. The rotating portion rotates around a rotation axis and is connected to the supporting wall, to drive the gimbal camera to rotate relative to the body. The rotation axis is parallel to the supporting wall. In response to the rotating portion driving the gimbal camera to rotate to the expanded state, the rotating portion abuts against the supporting wall; and in response to the rotating portion driving the gimbal camera to rotate to the folded state, the gimbal camera fits to a side wall of the body adjacent to the supporting wall.

DETAILED DESCRIPTION OF THE EMBODIMENTS

The technical solutions in the embodiments of the present disclosure are clearly and completely described in the following with reference to the accompanying drawings in the embodiments of the present disclosure. It is obvious that the described embodiments are only a part of the embodiments of the present disclosure, and not all of the embodiments. All other embodiments obtained by those skilled in the art based on the embodiments of the present disclosure without creative efforts are within the scope of the present disclosure.

Exemplary embodiments will be described in detail herein, examples of which are illustrated in the accompanying drawings. When the following description refers to the drawings, unless otherwise indicated, the same numbers in different figures represent the same or similar elements. The embodiments described in the following exemplary embodiments do not represent all embodiments consistent with the present disclosure. Instead, they are merely examples of devices and methods consistent with aspects of the disclosure as detailed in the appended claims.

The terminologies used in the present disclosure are for the purpose of describing particular embodiments, and are not intended to limit the disclosure. The singular forms "a" and "the" used in the present disclosure and the appended claims should also include plural forms. It should also be understood that the term "and/or" as used herein refers to and encompasses any and all possible combinations of one or more of the associated listed items.

The present disclosure provides a gimbal photographing device that occupies a small space and is portable when it is not in operation. Embodiment of the present disclosure addresses the problems related to device randomly shaking, being unstable, large device size, and inconvenient to port in current gimbal cameras when the gimbal photographing device is not in operation. The gimbal photographing device of the present disclosure will be described in detail below with reference to the accompanying drawings. The embodiments and features of the embodiments described below may be combined to each other without conflict.

Figure 1:
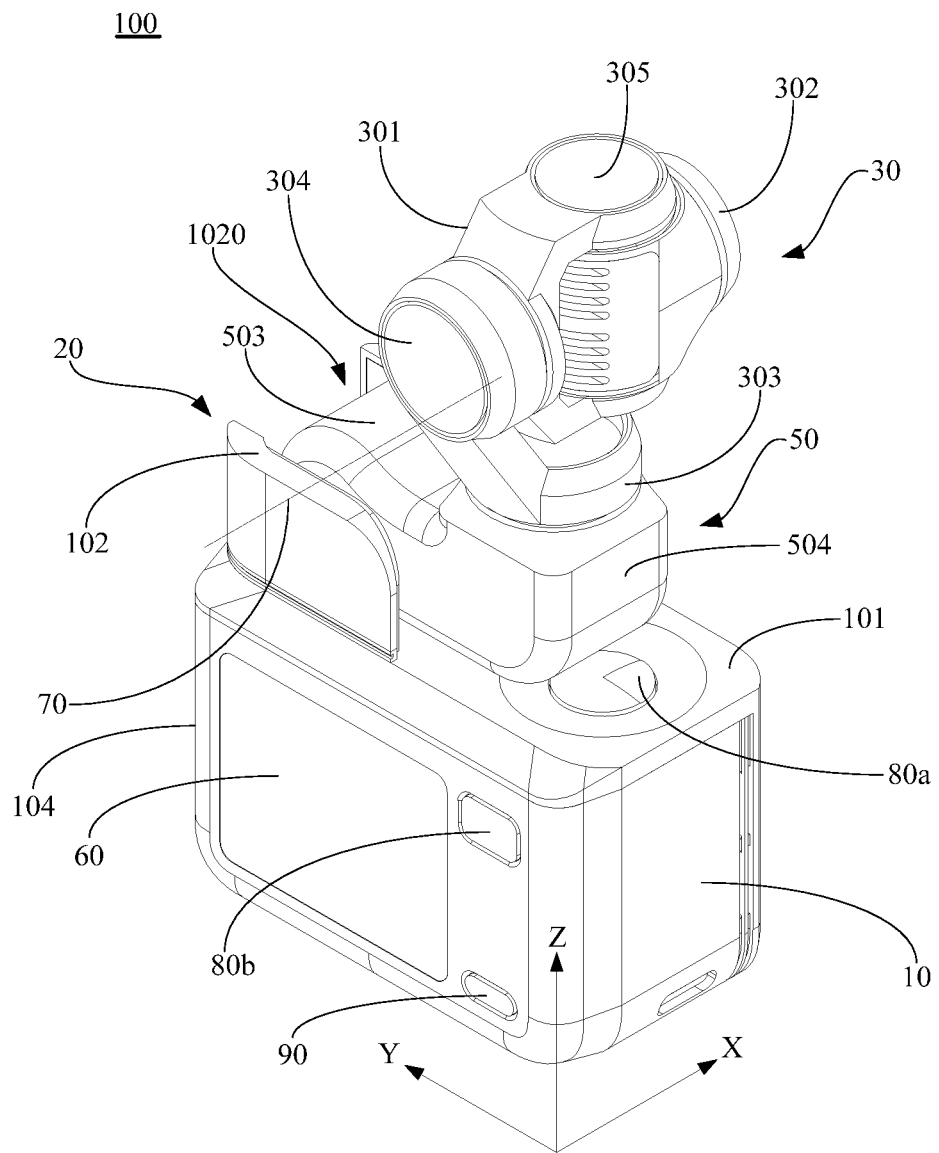
FIG. 1 illustrates a three-dimensional view of a gimbal photographing device in an expanded state consistent with embodiments of the present disclosure.
Figure 2:
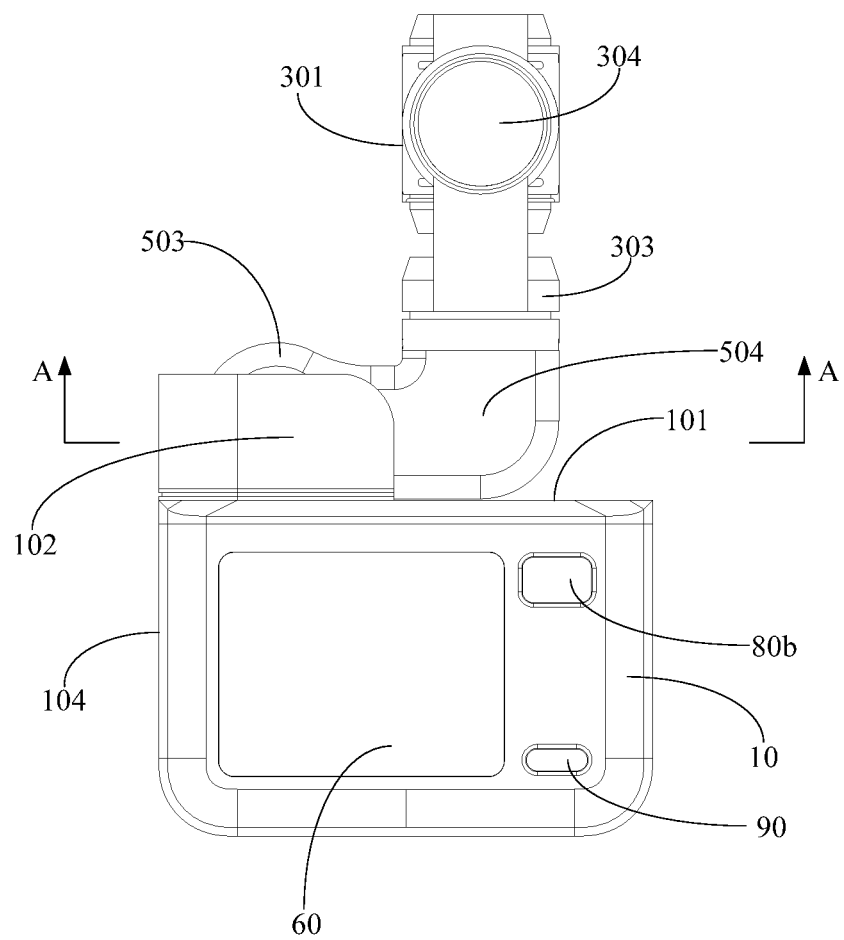
FIG. 2 illustrates a side view of a gimbal photographing device in an expanded state consistent with embodiments of the present disclosure.
Figure 3:
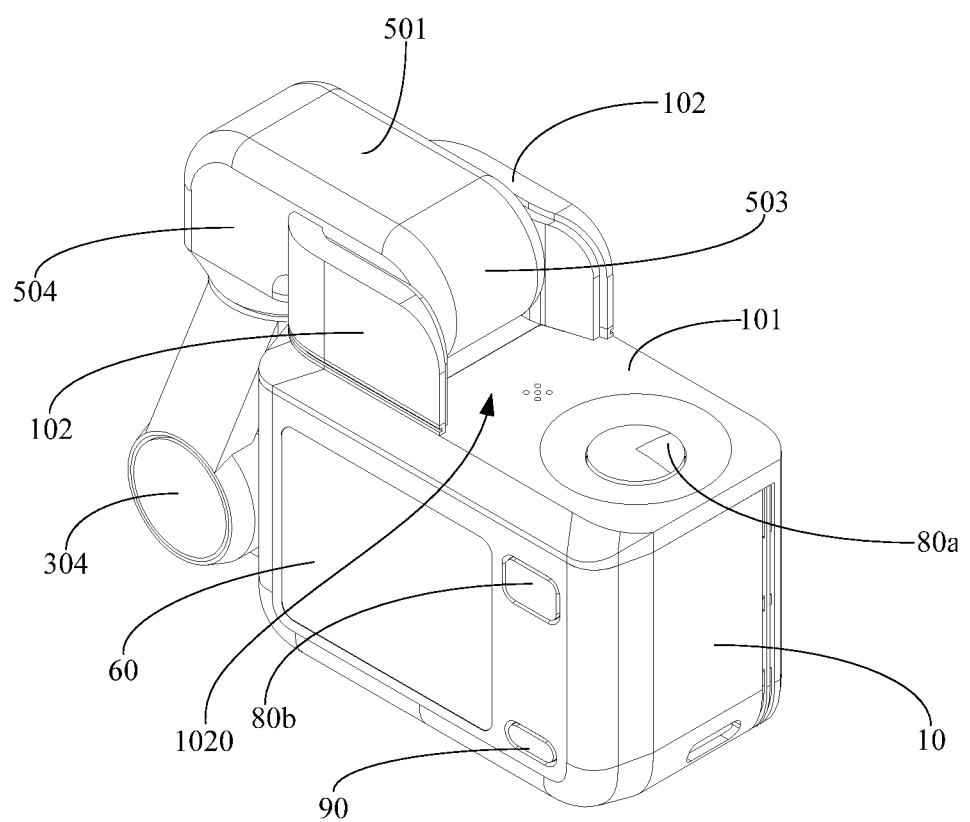
FIG. 3 illustrates a three-dimensional view of a gimbal photographing device in a folded state consistent with embodiments of the present disclosure.
Figure 4:
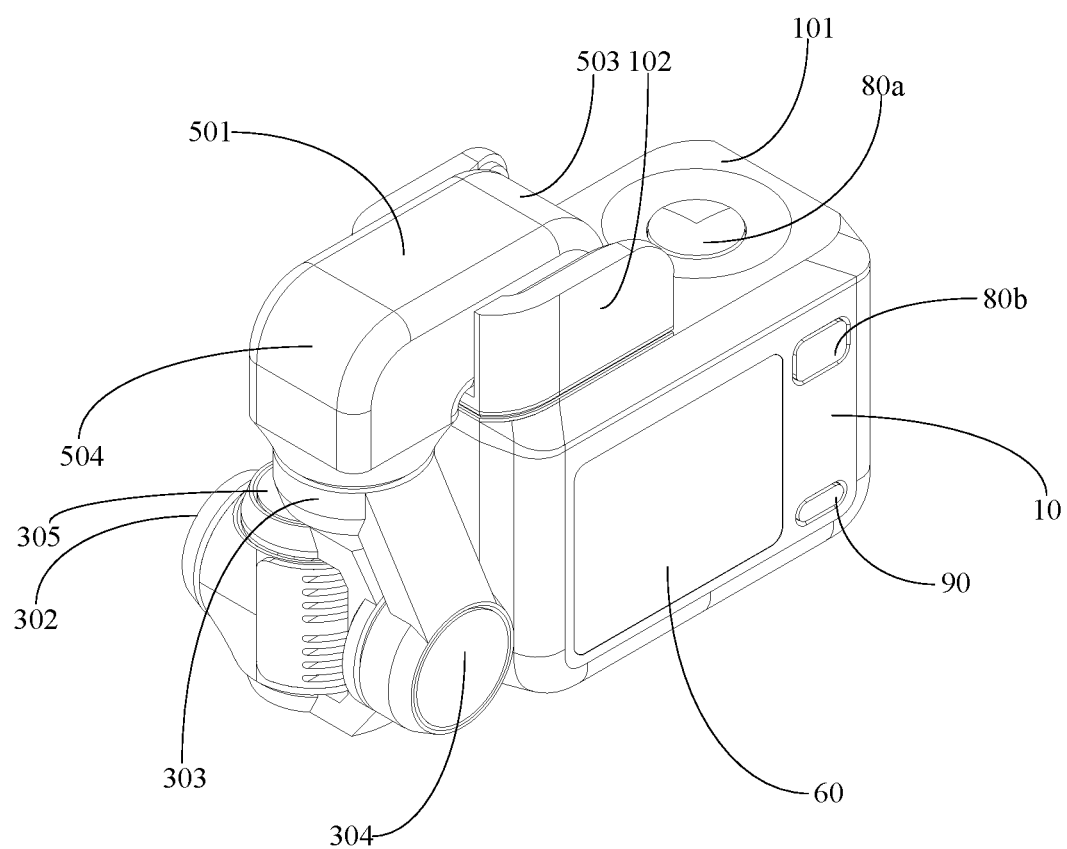
FIG. 4 illustrates a three-dimensional view from another perspective of a gimbal photographing device in a folded state consistent with embodiments of the present disclosure.
Figure 5:
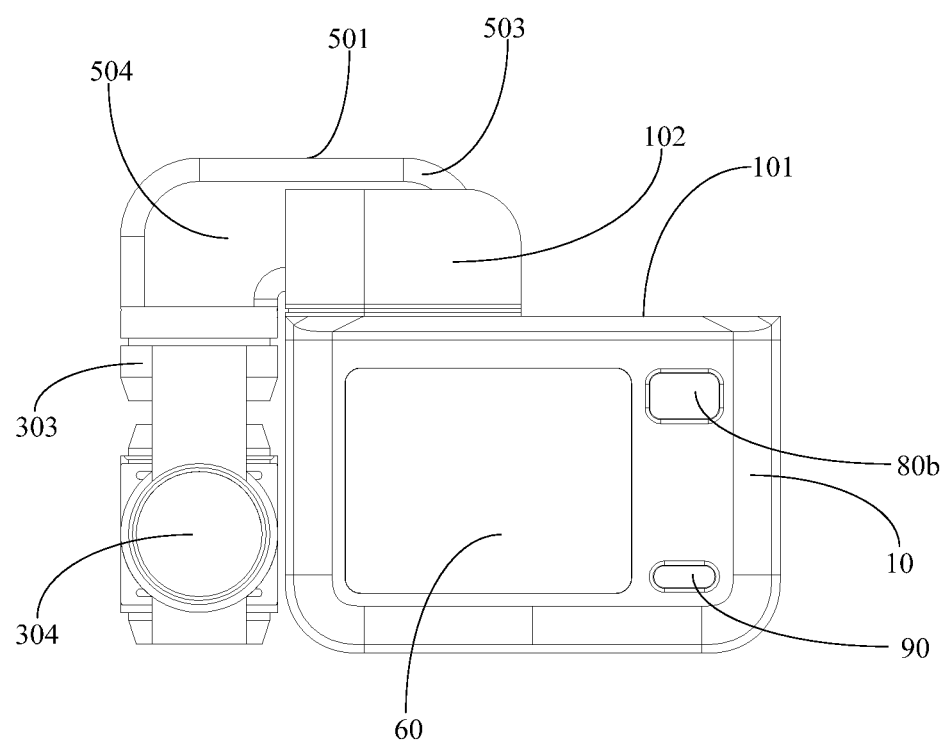
FIG. 5 illustrates a side view of a gimbal photographing device in a folded state consistent with embodiments of the present disclosure.

As shown in FIG. 1 to FIG. 5, a gimbal photographing device 100 according to some embodiment of the present disclosure includes: a body 10, a folding mechanism 20 connected to the body 10, and a gimbal camera 30 connected to the folding mechanism 20, the gimbal camera 30 can fit to the body 10 by the folding mechanism 20. The body 10 includes a supporting wall 101 for supporting the folding mechanism 20 and the gimbal camera 30. The gimbal camera 30 includes an expanded state (such as the expanded state shown in FIGS. 1 and 2) and a folded state (as shown in FIGS. 3 to 5), and the gimbal camera 30 is caused to switch between the expanded state and the folded state by the folding mechanism 20. Usually, the gimbal camera 30 is in a folded state when it is not in operation, and can be in an expanded state or a folded state during operation. In the present embodiment, a mounting position of the folding mechanism 20 may be disposed at a left edge of the supporting wall 101 of the body 10, or may be disposed at a right edge of the supporting wall 101 of the body 10. In the example shown in FIG. 1, the mounting position of the folding mechanism 20 is located at the left edge of the supporting wall 101 of the body 10. The body 10 has a rectangular structure, and the supporting wall 101 is located on a top surface of the body 10.

The folding mechanism 20 includes a supporting base 50, the supporting base 50 includes a rotating portion 503 and a bent portion 504, and a first end of the bent portion 504 is connected to the rotating portion 503, a second end of the bent portion 504 is connected to the gimbal camera 30. The rotating portion 503 is rotatably connected to the supporting wall 101 around a rotation axis 70 to drive the gimbal camera 30 to rotate relative to the body 10, thereby implementing the switching of the gimbal camera 30 between the expanded state and the folded state. The rotation axis 70 is parallel to the supporting wall 101, and a disposition direction of the rotation axis 70 is an X direction as shown in FIG. 1.

The rotating portion 503 of the supporting base 50 drives the gimbal camera 30 to rotate, the rotating portion 503 abuts against the supporting wall 101, and limits the position of the gimbal camera 30 by matching the rotating portion 503 with the supporting wall 101 of the body 10, so that a position of the gimbal camera 30 in the expanded state remains stable. The rotating portion 503 of the support 50 drives the gimbal camera 30 to be in the folded state, and the gimbal camera 30 fits to a side wall 104 of the body 10 adjacent to the supporting wall 101, which is equivalent to be disposed at a side of the body 10, to reduce a volume of the gimbal photographing device 100 and further solve the problem of a large space occupation of the gimbal camera 30 when it is not in operation and is in the folded state, and prevents the gimbal camera 30 from shaking when it is not in operation, thereby better implementing a portable carrying and storage of the gimbal photographing device 100. In the example shown in FIG. 1, the supporting wall 101 is located on the top surface of the body 10, and the side wall 104 is located on the side of the body 10.

Accordingly, from the above embodiment, in the gimbal photographing device 100 of the present disclosure, the rotating portion 503 of the supporting base 50 of the folding mechanism 20 drives the gimbal camera 30 to switch between the expanded state and the folded state, thereby implementing a folding function of the gimbal camera 30. When the gimbal photographing device 30 is expanded to operate, the position of the gimbal photographing device 30 is limited by matching the rotating portion 503 with the supporting wall 101 of the body 10, so that a position of the gimbal camera 30 in the expanded state remains stable. When the gimbal camera 30 is not in operation, the gimbal camera 30 can be folded to fit to the side wall 104 of the body 10, to reduce the volume of the gimbal photographing device 100 and solve the problem of large space occupation when the gimbal camera 30 is not in operation and is in the folded state, and prevent the gimbal camera 30 from shaking when it is not in operation and is in the folded state, thereby better implementing the portable carrying and storage of the gimbal photographing device 100 as well as an integrated compact structural design.

In an optional embodiment, the gimbal camera 30 includes a gimbal stand and a camera 302 mounted on the gimbal stand. The gimbal stand may be a single-axis, two-axis or multi-axis gimbal stand. In the example shown in the drawings, the gimbal stand is a three-axis gimbal stand, and the three-axis gimbal stand includes: a translation axis assembly 303 movably connected to the bent portion 504 of the supporting base 50, a rolling axis assembly 304 movably connected to the translation axis assembly 303, and a pitch axis assembly 305 movably connected to the rolling axis assembly 304; the camera 302 is mounted on the pitch axis assembly 305. The translation axis assembly 303 controls a translational motion of the gimbal camera 30 by a translation axis motor, the rolling axis assembly 304 controls a rolling motion of the gimbal camera 30 by a rolling axis motor, and the pitching axis assembly 305 controls a pitching motion of the gimbal camera 30 by a pitching axis motor, to further control the camera 302 to take photographs from different photographing angles and adjust the position of the gimbal camera 30 according to the photographing angle as needed. When the gimbal camera 30 is in a folded state (as shown in FIG. 4), a rotation axis of the translation axis assembly 303 is perpendicular to the rotation axis 70, and a rotation axis of the rolling axis assembly 304 is parallel to the rotation axis 70, and a rotation axis of the pitching axis assembly 305 is perpendicular to the rotation axis 70. When the gimbal camera 30 is in an expanded state (as shown in FIG. 1), the rotation axis of the translation axis assembly 303 is perpendicular to the rotation axis 70, and a position of the rotation axis of the rolling axis assembly 304 relative to the rotation axis 70 may vary depending on a rotation of the translation axis assembly 303, and a position of the rotation axis of the pitching axis assembly 305 relative to the rotation axis 70 may vary depending on a rotation of the rolling axis assembly 304.

In an optional embodiment, referring to FIG. 1 and FIG. 2, the gimbal camera 30 includes an fitting surface 301. In the example shown in FIG. 1, the fitting surface 301 is disposed at an end of the camera 302 on the gimbal camera 30 near the rotation axis 70. When the gimbal camera 30 is not in operation, the rotating portion 503 of the supporting base 50 drives the gimbal camera 30 to rotate to the folded state, and the fitting surface 301 is abutted against the side wall 104 of the body 10, to limit the position of the gimbal camera 30 by matching the fitting surface 301 of the gimbal camera 30 with the side wall 104 of the body 10, thereby reducing the volume of the gimbal photographing device 100 and the position of the gimbal photographing device 30 in the folded state remains stable when it is not in operation, preventing the gimbal camera 30 from shaking. As shown in FIGS. 3-5, an abutting surface 501 is disposed at an end surface of the rotating portion 503 of the supporting base 50 facing away from the gimbal camera 30, and the rotating portion 503 of the supporting base 50 drives the gimbal camera 30 to rotate to the expanded state, and the abutting surface 501 abuts against the supporting wall 101 of the body 10, and limits the position of the gimbal camera 30 by the matching of the abutting surface 501 of the rotating portion 503 with the supporting wall 101 of the body 10, so that the position of the gimbal camera 30 in the expanded state remains stable.

Further, in order to make the position of the gimbal camera 30 in the folded state more stable, fixed structures matching each other may be disposed at the fitting surface 301 on the gimbal camera 30, and the side wall 104 of the body 10 corresponding to the fitting surface 301 of the gimbal camera 30, respectively, to cause the gimbal camera 30 less likely to shake when it fits to the side wall 104 of the body 10. For example, the fixed structures matching each other may be one of: a buckling structure, a magnet absorbing structure, or a locking structure.

In an optional embodiment, the gimbal camera 100 further includes a rotating shaft assembly connected to the supporting wall 101, the rotating shaft assembly includes a rotating shaft 201, and the rotating shaft 201 is disposed along a direction of the rotation axis 70. The rotating portion 503 of the supporting base 50 is pivotally connected to the rotating shaft 201. It should be noted that the manner of a rotation of the rotating portion 503 of the supporting base 50 relative to the body 10 is not limited to the manner of disposing the rotating shaft, and may be implemented by disposing other pivoting mechanisms or multi-connecting rod mechanisms. Implementations are intended to be included within the scope of the present disclosure.

The rotating shaft 201 can be implemented by a variety of rotating shafts, such as an integral rotating shaft, a rotating shaft matching a positioning shaft, a damping shaft, a spring shaft, etc. The rotating forms of the rotating shaft 201 will be described below by taking the integral shaft and the rotating shaft matching the positioning shaft as the rotating shaft 201 as examples.

Figure 6:
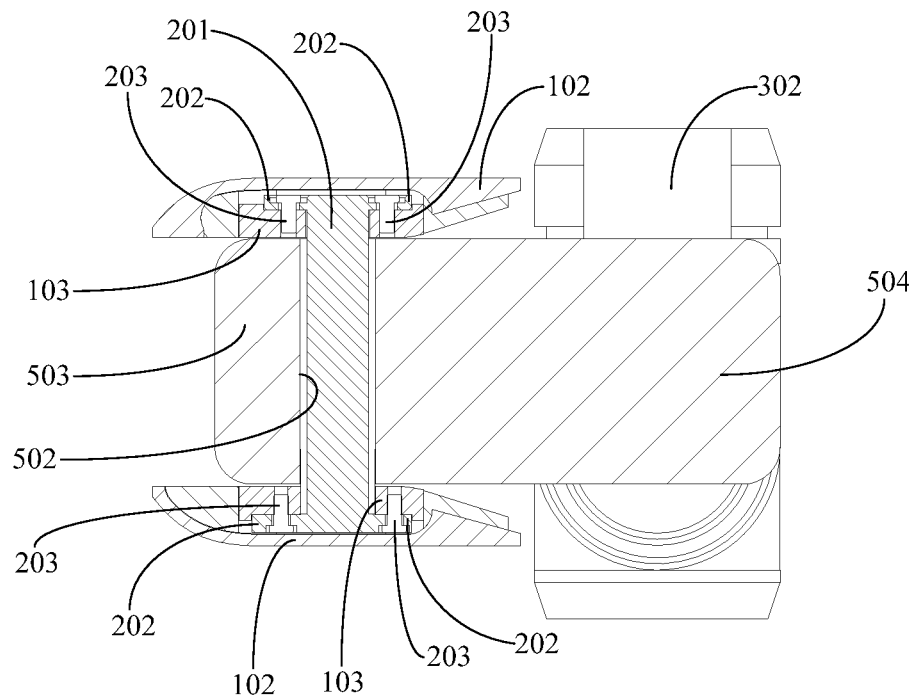
FIG. 6 illustrates a cross-sectional view, along an A-A direction, of a first type of rotation of the gimbal photographing device as shown in FIG. 2 consistent with embodiments of the present disclosure.

(1) The rotating shaft 201 implements a rotating form in an integral rotating shaft: as shown in FIG. 1, FIG. 3 and FIG. 6, the rotating shaft assembly further includes two supporting members 102 connected to the supporting wall 101, the two supporting members 102 are oppositely disposed in the direction of the rotation axis 70. Two notches 1020 (as shown in FIG. 1 and FIG. 3) are respectively formed between two ends of the two supporting members 102 for providing space for the rotating portion 503 of the supporting base 50 and the gimbal camera 30 to rotate through; two ends of the rotating shaft 201 are respectively connected to the two supporting members 102. It can be understood that during a rotation of the gimbal camera 30 between the expanded state and the folded state, both the bent portion 504 of the supporting base 50 and the gimbal camera 30 need to pass through the two notches 1020 described above. The supporting member 102 can be regarded as a protruding structure formed by the supporting wall 101 of the body 10 extending vertically upward. A through hole 502 is disposed in the rotating portion 503 of the supporting base 50 extending in the direction of the rotating axis 70. The rotating shaft 201 is disposed through the through hole 502 so that the rotating portion 503 of the supporting base 50 can be pivotally connected to the rotating shaft 201, and the rotating portion 503 of the supporting base 50 can drive the gimbal camera 30 to rotate relative to the body 10.

Further, a shaft bracket 103 is disposed on the supporting member 102. A shaft seat 202 is disposed at each of the two ends of the rotating shaft 201, and the shaft seat 202 is fixed to the shaft bracket 103 by a fastener 203, to fix the rotating shaft 201 and the two supporting members 102. Optionally, the fasteners 203 may be screws, or may be fixed connection manners such as pins, glues, etc., or similarly deformed connection manners, all of which are included in the protected scope of the present disclosure.

Figure 7:
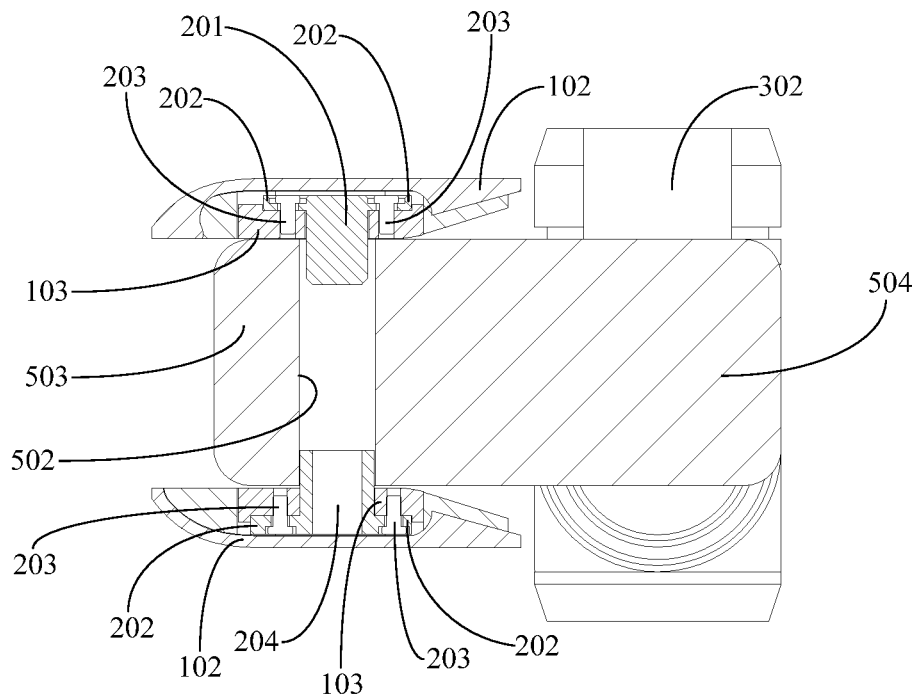
FIG. 7 illustrates a cross-sectional view, along an A-A direction, of a second type of rotation of the gimbal photographing device shown in FIG. 2 consistent with embodiments of the present disclosure.

(2) The rotating shaft 201 implements a rotating form in a rotating shaft matching a positioning shaft: Referring to FIG. 1, FIG. 3 and FIG. 7, the rotating shaft assembly further includes a positioning shaft 204 coaxially disposed with the rotating shaft 201, and the two supporting members 102 connected to the supporting wall 101. The two supporting members are oppositely disposed in the direction of the rotating axis 70, and the two notches 1020 are respectively formed between the two ends of the two supporting members 102 to allow the space for the rotation of the rotating portion 503 of the supporting base 50 and the gimbal camera 30. The rotating shaft 201 is connected to one of the supporting members 102, and the positioning shaft 204 is connected to the other supporting member 102. One end of the rotating portion 503 of the supporting base 50 is pivotally connected to the rotating shaft 201, and the other end of the rotating portion 503 of the supporting base 50 is pivotally connected to the positioning shaft 204. It can be understood that during the rotation of the gimbal camera 30 between the expanded state and the folded state, both the bent portion 504 of the supporting base 50 and the gimbal camera 30 need to pass through the two notches 1020 described above.

A through hole 502 is disposed in the rotating portion 503 of the supporting base 50 extending in the direction of the rotating axis 70. The rotating shaft 201 is disposed at one end of the through hole 502, and the positioning shaft 204 is disposed at the other end of the through hole 502, so that the rotating portion 503 of the supporting base 50 is pivotally connected to the rotating shaft 201, and the rotating portion 503 of the supporting base 50 can drive the gimbal camera 30 to rotate relative to the body 10. Of course, the through hole 502 can also be substituted by two end holes that are coincident with the axis, that is, two blind holes respectively disposed at the two ends of the rotating portion 503 of the supporting base 50, the rotating shaft 201 is disposed in one blind hole, and the positioning shaft 204 is disposed in the other blind hole. Alternatively, two blind holes are disposed in the two supporting members 102, the rotating shaft 201 and the positioning shaft 204 are respectively disposed at two ends of the rotating portion 503 of the supporting base 50, the rotating shaft 201 is disposed in one blind hole, and the positioning shaft 204 is disposed in the other blind hole. Likewise, the rotating portion 503 of the supporting base 50 can be pivotally connected to the rotating shaft 201, so that the rotating portion 503 of the supporting base 50 can drive the gimbal camera 30 to rotate relative to the body 10.

Further, a shaft bracket 103 is disposed on each of the two supporting members 102, and two shaft seats 202 are respectively disposed on an end of the rotating shaft 201 and an end of the positioning shaft 204, and the shaft seat 202 is fixed to the shaft bracket 103 of a corresponding supporting member 102 by the fastener 203, to fix the rotating shaft 201 and the positioning shaft 204 to each corresponding supporting member 102. Optionally, the fasteners 203 may be screws, or may be fixed connection manners such as pins, glues, etc., or the similarly deformed connection manners, all of which are included in the protected scope of the present disclosure.

In an optional embodiment, the two ends of the rotating portion 503 of the supporting base 50 respectively fit to the two supporting members 102, to ensure a stability of the rotating portion 503 of the supporting base 50 when rotating around the rotating shaft 201. Optionally, the rotating portion 503 of the supporting base 50 and the bent portion 504 are integrally formed into one piece, and a connection between the rotating portion 503 and the bent portion 504 is a smooth transition. In the example shown in the drawings, the rotating portion 503 and the bent portion 504 are integrally formed into an L-shaped structure. In the example as shown in FIG. 1, a first portion of the L-shaped structure is disposed in a direction perpendicular to the rotation axis 70 (the Y direction as shown in FIG. 1), and a second portion of the L-shaped structure is disposed along a direction perpendicular to the supporting wall 101 of the body 10 (the Z direction as shown in FIG. 1), the gimbal camera 30 is connected to the second portion of the L-shaped structure. Of course, the rotating portion 503 and the bent portion 504 may be integrally formed into another configuration, so long as the gimbal camera 30 can fit to the side wall 104 of the body 10 when rotating from the expanded state to the folded state.

Further, a length of the rotating portion 503 of the supporting base 50 (which can be understood as a length along the Y direction in FIG. 1) is smaller than the length of the body 10 (also understood as a length along the Y direction in FIG. 1), but is greater than the distance between the rotating portion 503 and the side wall 104. The length of the rotating portion 503 is smaller than the length of the body 10, to ensure that the position of the gimbal camera 30 in the expanded state is within the structural range of the body 10. The length of the rotating portion 503 is greater than the distance between the rotating portion 503 and the side wall 104, to ensure that the bent portion 504 protrudes from the body 10 when the gimbal camera 30 is in the folded state, so that The gimbal camera 30 can fit to the side wall 104 of the body 10. Of course, the size of the gimbal camera 30 also needs to be adapted to the bent portion 504, to avoid the problem that when the gimbal camera 30 is in the folded state, although the bent portion 504 protrudes from the body 10, the size of the gimbal camera 30 is too large or too small to fit to the side wall 104 of the body 10. For example, in the example shown in the drawings, the size of the gimbal camera 30 is the same as the size of the bent portion 504.

In an optional embodiment, the bent portion 504 of the supporting base 50 is disposed obliquely to the rotating portion 503, and the gimbal camera 30 is connected to the bent portion 504 along the direction of the bent portion 504 oblique to the rotating portion 503, thereby restricting a rotation angle of the gimbal camera 30. Optionally, an oblique angle between the bent portion 504 and the rotating portion 503 ranges from 85° to 95°, preferably 90°, so that the gimbal camera 30 can be controlled to rotate 180° from the folded state (that is, folded and fitting to the side wall 104 of the body 10) to the expanded state (that is, erecting above the body 10), or rotate 180° from the expanded state to the folded state. And during the rotation, both the bent portion 504 of the supporting base 50 and the gimbal camera 30 need to pass through two notches 1020 formed between the two supporting members 102.

In an optional embodiment, a button is further disposed on the body 10 is further to control the camera 302 for photographing (which may be image capture or video capture). Optionally, a first button 80a (the first button 80a is shown on a top surface of the body 10) may be disposed on the supporting wall 101 of the body 10, for the user to operate the camera 302 for photographing when the gimbal camera 30 is in the expanded state. Optionally, a second button 80b (the second button 80b is shown on the side of the body 10) may be disposed on a sidewall of the body 10 adjacent to the supporting wall 101, for example, the second button 80b is disposed on the side of the body 10 away from the camera 302, for the user to operate the camera 302 when the gimbal camera 30 is in the folded state, so that the gimbal camera 30 can still be used for photographing in the folded state. In addition, when the gimbal camera 30 is in the expanded state, the second button 80b can also adjust the gimbal frame of the gimbal camera 30 to change the photographing angle of the camera 302, and convert the photographing mode of the camera 302. For example, when the gimbal camera 30 is in the expanded state, the second button 80b may be pressed to switch the photographing mode of the camera 302 between the image mode and the video mode. The second button 80b may be pressed twice continuously to adjust the gimbal frame to return to a reset mode, to implement an automatic reset function. The second button 80b may be pressed three times continuously to control the translational axis assembly 303 of the gimbal frame to rotate, so that the camera 302 is turned toward the user to implement a self-photographing function. It can be understood that times of the button being pressed and corresponding modes of the gimbal camera 30 can be set according to needs, and are not limited to the embodiment.

Further, a power button 90 is further disposed on the body 10 for turning on or off the gimbal photographing device 100. Optionally, a power button 90 is disposed on the side wall of the body 10 adjacent to the supporting wall 101. In the example shown in the drawings, the power button 90 and the second button 80b are disposed on the same side of the body 10, above the second button 80b.

Figure 8:
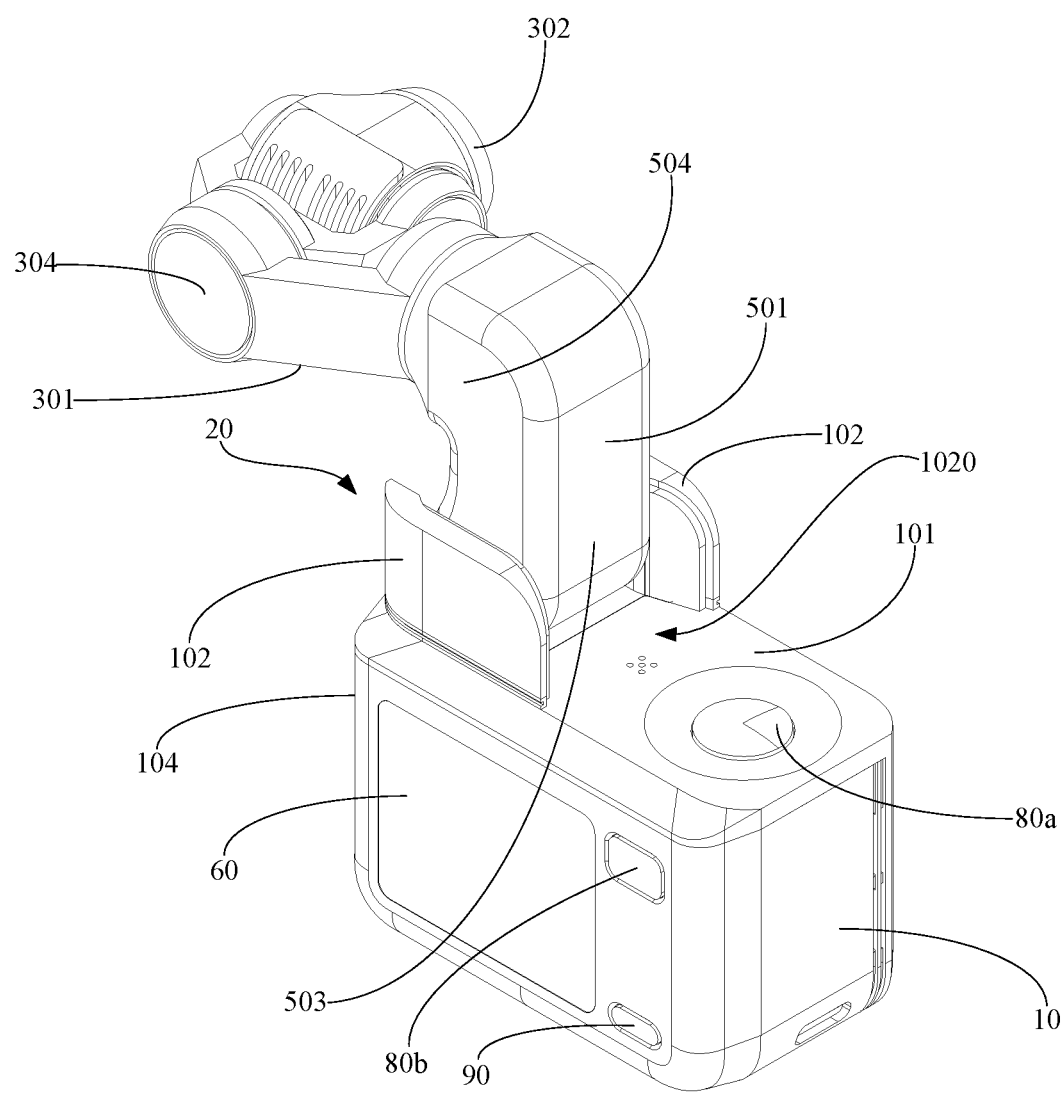
FIG. 8 illustrates a three-dimensional view of a gimbal photographing device during rotation consistent with embodiments of the present disclosure.
Figure 9:
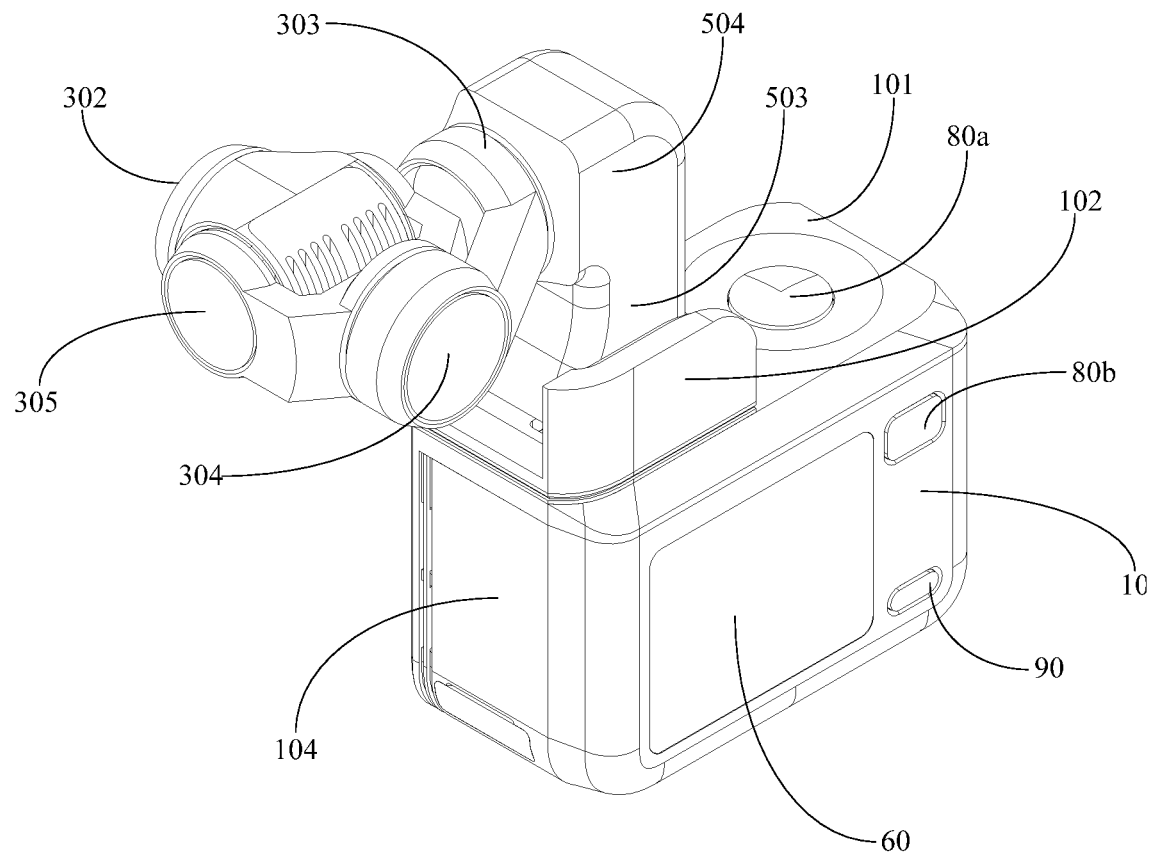
FIG. 9 illustrates a three-dimensional view from another perspective of a gimbal photographing device during rotation consistent with embodiments of the present disclosure.
Figure 10:
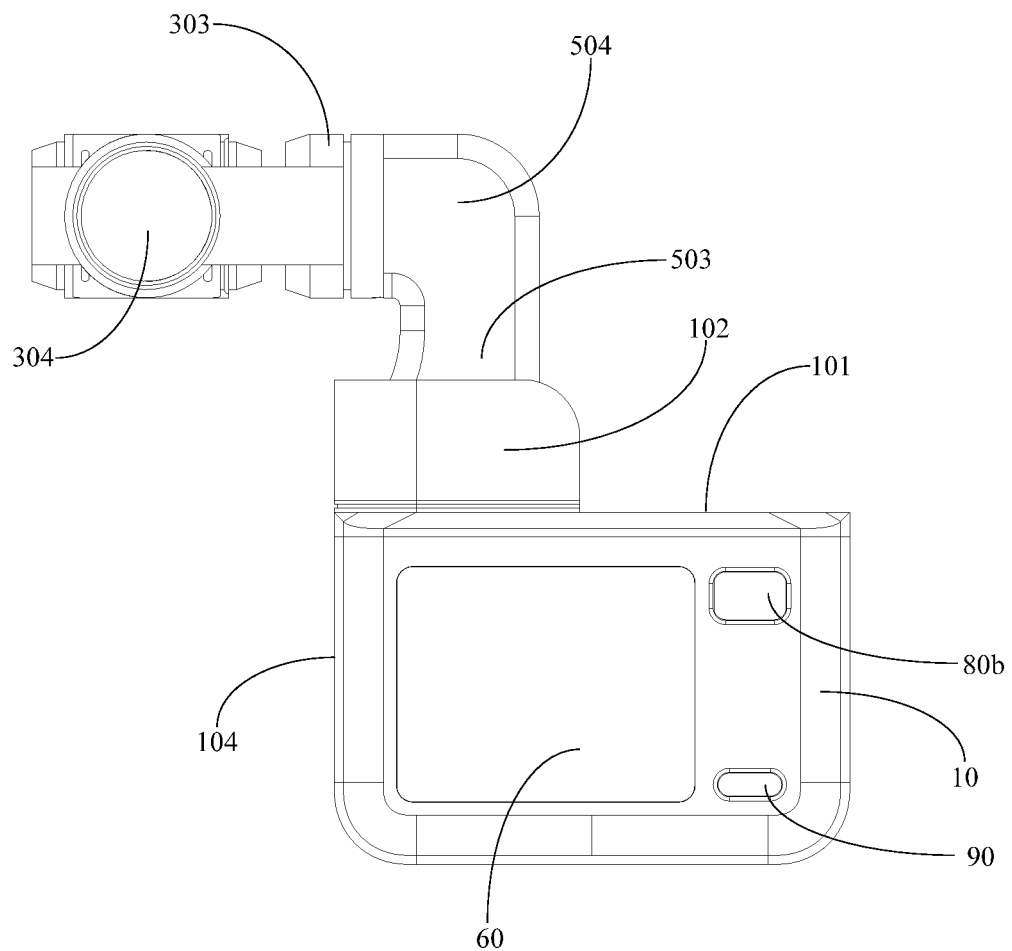
FIG. 10 illustrates a side view of a gimbal photographing device during rotation consistent with embodiments of the present disclosure.

Referring to FIG. 1, FIG. 3 and in conjunction with FIG. 8 to FIG. 10, when the gimbal camera 30 rotates from the expanded state to the folded state, the position of the gimbal camera 30 rotates from the position erecting above the supporting wall 101 of the body 10 as shown in FIG. 1, to a flat position as shown in FIG. 8, and rotates from the position as shown in FIG. 8 to a position fitting to the side wall 104 of the body 10 as shown in FIG. 3. Accordingly, the position changes similarly when the gimbal camera 30 switches from the expanded state to the non-operating state. When the gimbal camera 30 rotates from the folded state to the expanded state, the position of the gimbal camera 30 rotates from the position fitting to the side wall 104 of the body 10 as shown in FIG. 3 to the flat position as shown in FIG. 8, and rotates from the flat position as shown in FIG. 8 to the position erecting above the supporting wall 101 of the body 10 as shown in FIG. 1. Accordingly, the position changes similarly when the gimbal camera 30 switches from the non-working state to the expanded state. When the gimbal camera 30 is operating in the expanded state, the camera 302 can be operated by the first button 80a for photographing. When the gimbal camera 30 needs to operate in the folded state, the camera 302 can be operated by the second button 80b for photographing.

In an optional embodiment, the gimbal camera 30 can be manually rotated. The gimbal photographing device 100 further includes a locking structure for locking the rotating portion 503 of the supporting base 50. When the rotating portion 503 of the supporting base 50 drives the gimbal camera 30 to rotate to the expanded state, the position of the rotating portion 503 of the supporting base 50 is locked by the locking structure, so that the position of the gimbal camera 30 in the expanded state remains stable. The specific structure of the locking structure can be designed according to different needs. For example, the locking structure can be a buckle, a plug, etc. In another optional embodiment, the gimbal camera 30 can be directly rotated by a driving motor without a need to provide the above-described locking structure. The gimbal photographing device 100 further includes a driving motor connected to the rotating portion 503 of the supporting base 50, and the rotating portion 503 of the supporting base 50 is driven to rotate around the rotating shaft 201 by the driving motor, thereby driving the gimbal camera 30 to rotate relative to the body 10. The rotation angle of the gimbal camera 30 can be set by setting an action time or speed of the driving motor.

In an optional embodiment, the gimbal photographing device 100 may include a display screen 60 mounted on one side of the body 10 so that the user can observe when photographing. In the example shown in the drawings, the display screen 60, the second button 80b and the power button 90 are disposed on the same side of the body 10, that is, the body 10 is adjacent to the side wall 104 away from the side of the camera 302. In another optional embodiment, the gimbal photographing device 100 may include a mounting frame for mounting an external displaying device, the mounting frame is mounted on the body 10. The external displaying device may be a device capable of receiving an image captured by the camera 302, such as a mobile phone or a tablet computer, and is also viewable by the user when photographing.

In summary, the gimbal camera 100 of the present disclosure drives the gimbal camera 30 to switch between the expanded state and the folded state by the rotating portion 503 of the supporting base 50 of the folding mechanism 20, thereby implementing the folding function of the gimbal camera 30. When the gimbal camera 30 is operated in the expanded state, the gimbal camera 30 can be expanded to work normally, and the position of the gimbal camera 30 is limited by matching the rotating portion 503 with the supporting wall 101 of the body 10, so that the position of the gimbal camera 30 in the expanded state remains stable. When the gimbal photographing device 30 is not operating, the gimbal camera 30 can be folded and fit to the side wall 104 of the body 10, to reduce the volume of the gimbal photographing device 100 and solve the problem of large space occupation when the gimbal camera 30 is not in operation and is in the folded state, and prevent the gimbal camera 30 from shaking when it is not in operation, thereby better implementing the portable carrying and storage of the gimbal photographing device 100 as well as the integrated compact design.

It should be noted that, in this specification, relational terms such as first and second are used merely to distinguish one entity or operation from another entity or operation, and do not necessarily require or imply any actual relationship or order among these entities or operations. The terms "including", "comprising" or any variations that are intended to include a non-exclusive inclusion, such that a process, method, article, or device that comprises a plurality of elements includes not only those elements but also other items not specifically listed, or elements that are inherent to such a process, method, item, or device. Without further limitations, an element that is defined by the phrase "comprising a . . . " does not exclude the presence of additional equivalent elements in the process, method, item, or device that comprises the element.

The method and device provided by the embodiments of the present disclosure are described in detail above. The principles and implementations of the present disclosure are described in the specific examples. The description of the above embodiments is only for helping to understand the method and its core idea of the present disclosure; at the same time, those skilled in the art, according to the idea of the present disclosure, can make variations to the specific embodiments and application scope. In summary, the contents of this specification should not be construed as to limit the present disclosure.

What is claimed is:

1. A gimbal photographing device comprising:
a body including a supporting wall;
a folding mechanism connected to the body and configured to rotate around a rotation axis; and
a gimbal camera connected to the folding mechanism and having an expanded state and a folded state;
wherein:
in response to the folding mechanism driving the gimbal camera to rotate to the expanded state, at least a portion of the folding mechanism abuts against the supporting wall; and
in response to the folding mechanism driving the gimbal camera to rotate to the folded state, the gimbal camera departs from the supporting wall.

2. The gimbal photographing device according to claim 1, wherein the rotation axis is parallel to the supporting wall.

3. The gimbal photographing device according to claim 1, wherein the folding mechanism includes a rotating portion and a bent portion, a first end of the bent portion being connected to the rotating portion, a second end of the bent portion being connected to the gimbal camera.

4. The gimbal photographing device according to claim 3, wherein the rotating portion is connected to the supporting wall, and is configured to rotate around the rotation axis to drive the gimbal camera to rotate relative to the body.

5. The gimbal photographing device according to claim 4, wherein:
the rotating portion includes an abutting surface at an end of the rotating portion away from the gimbal camera, the abutting surface being configured to abut against the support wall when the gimbal camera is in the expanded state; and
the gimbal camera includes a fitting surface at an end of the gimbal camera near the rotation axis, the fitting surface being configured to fit to the sidewall of the body when the gimbal camera is in the folded state.

6. The gimbal photographing device according to claim 3, wherein the bent portion is obliquely disposed with respect to the rotating portion along an oblique direction, and the gimbal camera is connected to the bent portion along the oblique direction from the rotating portion.

7. The gimbal photographing device according to claim 3, wherein the bent portion and the rotating portion are integrally formed into an L-shaped structure.

8. The gimbal photographing device according to claim 3, wherein a length of the rotating portion is smaller than a length of the body and is greater than a distance between the rotating portion and the side wall of the body.

9. The gimbal photographing device according to claim 1, further comprising:
a rotating shaft assembly connected to the supporting wall and including:
a rotating shaft disposed along the rotation axis, the folding mechanism being pivotally connected to the rotating shaft.

10. The gimbal photographing device according to claim 9, wherein the rotating shaft assembly further includes:
two supporting members connected to the supporting wall and oppositely disposed along the rotation axis, two ends of the rotating shaft being connected to the two supporting members, respectively.

11. The gimbal photographing device according to claim 10, wherein the rotating shaft assembly further includes:
a shaft bracket disposed on the supporting member, the rotating shaft being fixed to the shaft bracket; and
two shaft seats disposed on the two ends of the rotating shaft, respectively, each of the two shaft seats being fixed to the shaft bracket by a fastener.

12. The gimbal photographing device according to claim 9, wherein:
the rotating shaft assembly further includes:
a positioning shaft disposed coaxially with the rotating shaft; and
two supporting members connected to the supporting wall and oppositely disposed along the rotation axis, one of the two supporting members being connected to the rotating shaft, and another one of the two supporting members being connected to the positioning shaft; and
one side of the folding mechanism is pivotally connected to the rotating shaft, and another side of the folding mechanism is pivotally connected to the positioning shaft.

13. The gimbal photographing device according to claim 9, wherein two sides of the folding mechanism fit to the two supporting members, respectively.

14. The gimbal photographing device according to claim 1, wherein the gimbal camera includes:
a three-axis gimbal stand including:
a translation axis assembly movably connected to the folding mechanism, a rotation axis of the translation axis assembly being perpendicular to the rotation axis of the folding mechanism;
a rolling axis assembly movably connected to the translation axis assembly; and
a pitching axis assembly movably connected to the rolling axis assembly; and
a camera mounted at the pitching axis assembly.

15. The gimbal photographing device according to claim 1, further comprising:
a button disposed on the supporting wall and configured to operate the gimbal camera in the expanded state for photographing.

16. The gimbal photographing device according to claim 1, further comprising:
a button disposed on the side wall of the body and configured to:
operate the gimbal camera in the folded state for photographing, or
adjust a photographing angle or a photographing mode of the gimbal camera in the expanded state.

17. The gimbal photographing device according to claim 1, wherein:
the folding mechanism includes a supporting base connected to the body and the gimbal camera; and
a width of the body is larger than a width of the supporting base.

18. The gimbal photographing device according to claim 17, wherein:
the gimbal camera includes:
a three-axis gimbal stand including:
a translation axis assembly movably connected to the supporting base;
a rolling axis assembly movably connected to the translation axis assembly; and
a pitching axis assembly movably connected to the rolling axis assembly; and
a camera mounted at the pitching axis assembly; and
the supporting base has an elongated shape extending along a longitudinal direction perpendicular to a rotation axis of the translation axis assembly.

19. The gimbal photographing device according to claim 17, further comprising:
a display screen mounted at the body.

20. The gimbal photographing device according to claim 17, further comprising:
a button disposed on the body and configured to operate the gimbal camera.

* * * * *